United States Patent [19]
Liebman et al.

[11] Patent Number: 5,537,765
[45] Date of Patent: Jul. 23, 1996

[54] DOUBLE APERTURE TAG

[75] Inventors: Norman P. Liebman, Livingston; Louis Johnson, Newark, both of N.J.

[73] Assignee: Arch Crown, Inc., Roseland, N.J.

[21] Appl. No.: 173,567

[22] Filed: Dec. 27, 1993

[51] Int. Cl.⁶ ....................................... G09F 3/10
[52] U.S. Cl. ................... 40/299; 40/664; D20/27
[58] Field of Search .................. 40/299, 640, 664; 24/198, 200; D20/22, 27, 28

[56] References Cited

U.S. PATENT DOCUMENTS

| | | | |
|---|---|---|---|
| 87,634 | 1/1908 | Forstner . | |
| D. 277,115 | 1/1985 | Liebman . | |
| 1,209,075 | 12/1916 | Thomas | 24/198 |
| 1,695,036 | 12/1928 | Thursby . | |
| 2,054,227 | 9/1936 | Nichols . | |
| 3,760,466 | 9/1973 | Leblanc | 24/200 |
| 5,123,189 | 6/1992 | Fast et al. | 40/299 |

FOREIGN PATENT DOCUMENTS

| | | | |
|---|---|---|---|
| 2065792 | 10/1992 | Canada | 40/664 |
| 3622522 | 1/1988 | Germany | 24/198 |
| 170061 | 6/1934 | Switzerland . | |
| 2057 | 8/1866 | United Kingdom | 24/198 |

*Primary Examiner*—Brian K. Green
*Attorney, Agent, or Firm*—Weingram & Zall

[57] ABSTRACT

An identification tag for eyeglasses, spectacles and the like is formed from a flexible member having two opposed end portions and a central portion disposed therebetween. Each end portion has a pair of slots and ribs in parallel arrangement with each other. The slots and ribs are perpendicular to a longitudinal axis of the member. A peripheral edge of the tag is narrower at the central portion of the tag. The parallel slots and rib members coact for receiving a stem portion of an eyeglass frame to maintain the tag at a select position on the stem. An end portion of the tag can be folded back over on itself so that the slots at that end portion are brought into registration with each other for receiving the frame stem which is threaded through the aligned slots. The identification tag does not impede the line of sight through the lens, does not interfere with the application and positioning of the eyeglass frame to the wearer's face and does not detract from the appearance of the frame when a user is trying on the eyeglasses.

4 Claims, 2 Drawing Sheets

DOUBLE APERTURE TAG

BACKGROUND OF THE INVENTION

1. Field of the Invention

This invention relates to identification tags for spectacles, eyeglasses and the like and particularly to those tags adapted to be disposed onto the eyeglass frame and not obstruct the line of sight through the lens.

2. Description of the Prior Art

U.S. Pat. No. 876,341 to Forstner discloses a rein coupling having a female member formed from a metal blank having enlarged slotted ends adapted to be bent back upon itself so as to form a recessed end.

U.S. Pat. No. 1,695,036 to Thursby discloses a display device for eyeglass lenses which is formed from resilient material into a generally quadrilateral shape having open-ended slots at opposite ends of the device which are in registration with the screws of the eyeglass frame. The screws secure the device across the lens to display a trademark, etc. Another embodiment of the device has opposed legs which are disposed with the lenses in an internal groove of the eyeglass rims so that the device is similarly displayed across the lens.

U.S. Pat. No. 2,054,227 to Nichols discloses an identification tag for bales of goods or cotton which is adapted for permanent attachment to the goods. The device is formed from a metal longitudinal member having opposed ends which are flanged upwardly and perforated therethrough for receiving a bale tie.

U.S. Pat. No. Des. 277,115 to Liebman commonly assigned discloses an ornamental design for a spectacle tag having opposed slotted ends and a dumbell-like shape.

Swiss Pat. No. 170,161 to Geyer discloses a buckle for pants and which consists of two parts which are clasped together. One portion is formed with a plurality of holes while the other portion is formed with projections to be positioned for insertion into the corresponding holes.

The inventions discussed above do not disclose an identification tag having end portions formed with a pair of slots and ribs which coact to secure the tag to an eyeglass frame at a select position. None of the inventions previously discussed disclose an identification tag formed with two parallel slots at each of its ends, which apertures can be easily moved into registration with one another for receiving the eyeglass frame.

SUMMARY OF THE INVENTION

The tag of the present invention is formed from a uniform piece or blank of flexible material. The tag does not obstruct the wearer's vision or the positioning of the eyeglass frame to the wearer's face. The identification tag includes a flexible member having a peripheral edge, a first end portion, the first end portion having a first outer slot and a first inner slot disposed parallel with each other for receiving the frame stem; a second end portion at an opposite end of the flexible member, the second end portion having a second outer slot and a second inner slot disposed parallel with each other for receiving the frame stem; and a central portion disposed between the first and second end portions, the central portion having a surface upon which printed indicia is displayed. The parallel slots and rib member coact for receiving a stem portion of an eyeglass frame to maintain the tag at a select position on the stem.

Accordingly, it is an object of the present invention to provide an identification tag for eyeglass frames, which tag is removably mountable to the stem of the eyeglass frame.

It is also an object of the present invention to provide an identification tag which does not obstruct the line of sight through the eyeglass lens and does not impede the positioning and wearing of the eyeglass frame.

It is a further object of the present invention to provide an identification tag which is flexible for ease of manipulation to be mounted to the eyeglass frame.

It is a further object of the present invention to provide an identification tag which includes a surface area upon which printed indicia can be displayed.

It is a further object of the present invention to provide an identification tag which is reusable. It is yet another object of the present invention to provide an identification tag having a plurality of slots and ribs which coact with each other to maintain the tag at a select position on a frame stem of a spectacle on which the tag is installed.

BRIEF DESCRIPTION OF THE DRAWINGS

For a more complete understanding of the present invention, reference may be had to the following description of an exemplary embodiment of the present invention considered in connection with the accompanying drawings, in which.

DETAILED DESCRIPTION OF THE DRAWINGS

Referring to FIGS. 1–4, a double aperture identification tag 10 of the present invention is shown which is adapted for use with frames of eyeglasses, spectacles and the like.

Figure 5:
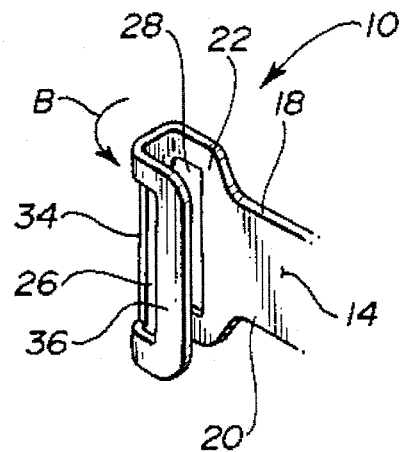
FIG. 5 is a perspective view of the present invention being folded for application to an eyeglass frame.
Figure 6:
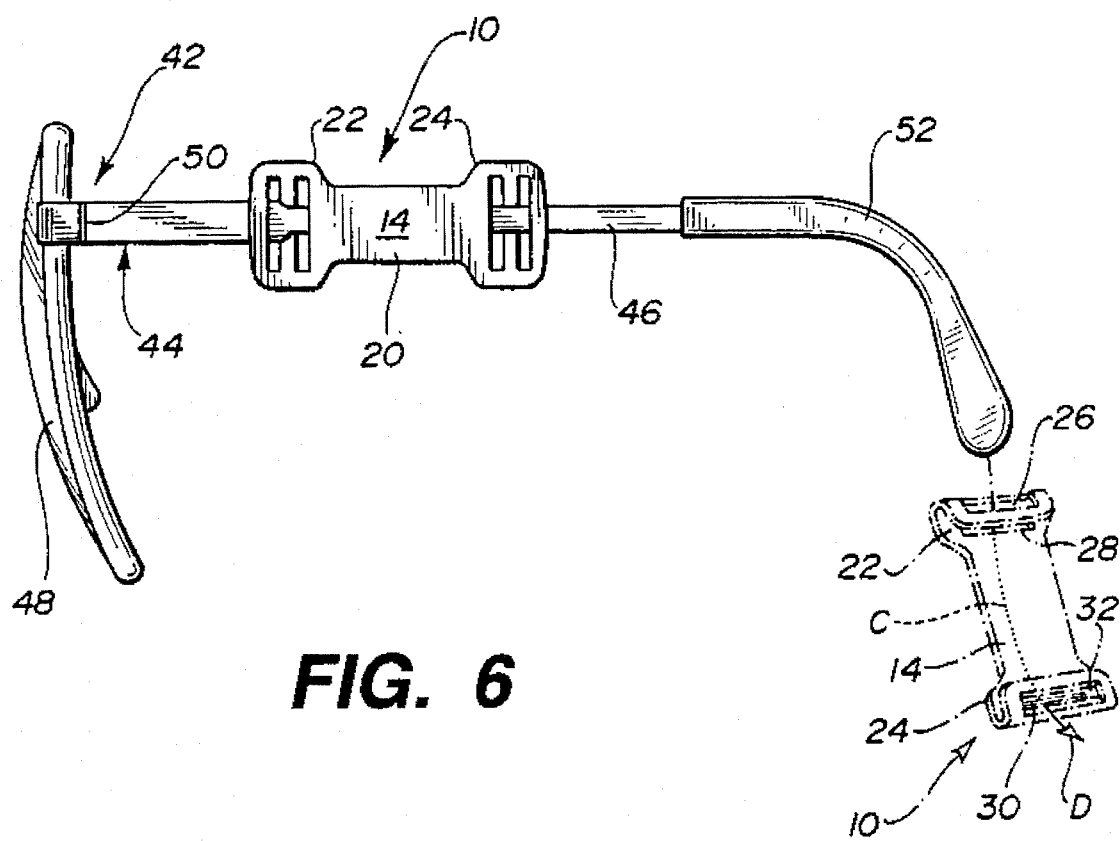
FIG. 6 is a view of the present invention being disposed onto the eyeglass frame for positioning thereto.

The tag 10 is formed from a flexible material member or blank 12. The flexible member 12 is preferably formed from a plastic or material having thermoplastic qualities. The tag must be made from a flexible material to urge any folded or displaced portion of the tag to return toward the original planar state as shown in FIGS. 5 and 6. The flexible member has opposed sides being a top surface 14 and a bottom surface 16, and a peripheral edge 18. The top 14 and bottom 16 surfaces are smooth and uniform in appearance.

The peripheral edge 18 is narrowed at opposed edges for forming a central portion 20 between opposed end portions 22, 24 of the member. The central portion 20 at the top and bottom surfaces 14, 16 provides a surface area for printed indicia to be displayed thereon.

The end portions 22, 24 are larger and more pronounced than the central portion 20 because the peripheral edge 18 at the width of the member is narrowed at the central portion 20. This results in the tag having a dumbell-like shape.

Each end portion has a pair of slots 26, 28 and 30, 32 disposed therethrough in parallel relationship with each other. The slots are arranged perpendicular to the longitudinal axis of the tag, which axis is represented by the broken line "A" in FIG. 2. Formation of the parallel slots at each end portion creates a pair of ribs 34, 36 and 38, 40 which are similarly parallel with each other and perpendicular to the longitudinal axis A. The slot-rib combination at each end portion 22, 24 facilitate securing the tag to the eyeglass frame.

Referring also to FIGS. 5 and 6, the identification tag 10 of the present invention is shown being manipulated and folded for application to an eyeglass frame.

In FIG. 5, the end portion 22 has been folded back over on itself toward the central portion 20 at the rib 34 in the direction of the arrow B so that the slot 26 is in registration with the slot 28. The end portion 24 is similarly folded back over on itself (FIG. 6) toward the central portion 20 at the rib 38 so that he slot 32 is in registration with the slot 30.

In FIG. 6, a pair of eyeglasses 42 is shown having the identification tag 10 of the present invention mounted to a frame 44 of the eyeglasses. The eyeglass frame includes a stem portion 46 to support lenses 48 at the wearers face (not shown). The stem portion 46 has an end 50 secured to a corresponding one of the lenses 48 and another opposed end 52 adapted to be retained on the wearers ear (not shown).

To apply the identification tag 10 to the eyeglass frame 44, the end portion 22 is folded over as described above with reference to FIG. 5. The end 52 of the stem portion 46 is then inserted into the slot 26 and subsequently through the slot 28 so that the end portion 22 is permitted to slide along the stem 46. As the end portion 22 is directed along the stem, the end 52 of the stem is directed along the bottom surface 16 behind the central portion 20 as indicated by the dashed line C in the direction of arrow D. In a manner similar to that shown in FIG. 5, the other end portion 24 of the tag is also manipulated and folded so that the slots 30, 32 are brought into registration with each other. The end of the stem is guided through the hole 30 and then through the hole 32. The tag is slid along the stem of the frame 44 to a select position which is proximate to the temple of the wearer. As can be seen from FIGS. 5 and 6, once the tag is slid to the proper location, the flexibility of the material forming the tag will tend to straighten the tag. Therefore, this will exert a force urging the slots and the ribs into close coordination and enhancing the frictional effect to prevent movement of the tag along the eyewear stem 44. By folding the tag between the two slots 26,28 and 30,32, the peripheral ends of the tag tend to bear against the eyewear stem to enhance the frictional forces which position the tag. The stem portion of the frame is behind the central portion 20 of the tag so that the stem portion does not obstruct the surface area 14 of the tag.

It will be understood that either end portion 22, 24 of the tag can be applied first to the frame. Application is the same regardless of which end portion is applied first.

Figure 1:
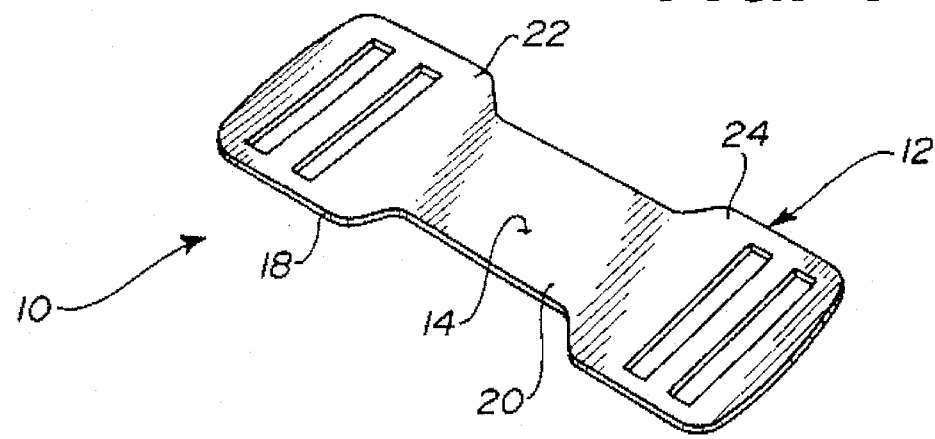
FIG. 1 is a perspective view of the identification tag of the present invention.
Figure 2:
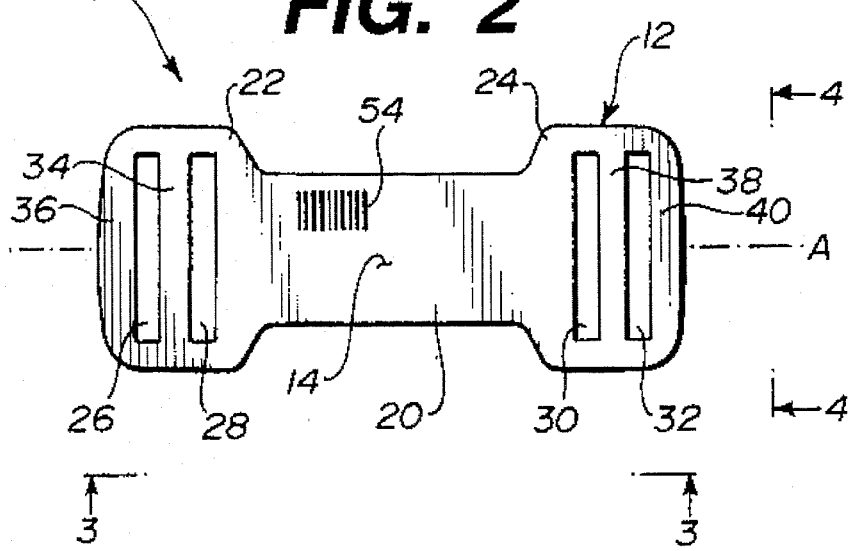
FIG. 2 is a top plan view of the present invention.
Figure 3:
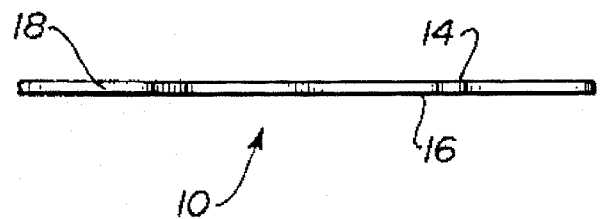
FIG. 3 is a side elevational view of the present invention taken along line 3—3 in FIG. 2.
Figure 4:
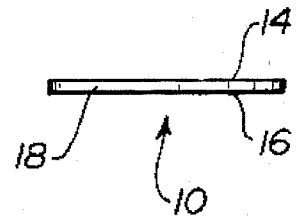
FIG. 4 is an end elevational view of the present invention taken along line 4—4 in FIG. 2.

The central portion of the identification tag shown in FIG. 6 provides a display area for printed indicia, such as price, model number, serial number, etc. The central portion can also be used as a surface for security sensing devices (not shown) to prevent theft. Of course, a bar code 54 as shown in FIG. 2 can be applied to the central portion for inventory and accounting purposes.

After the flexible member has been folded and inserted onto the stem, the member returns to its original planar shape so that the coaction between and among the slots and ribs at each end portion securely holds the tag to the eyeglass frame. The surface of the ribs increase friction between the tag and frame stem. The friction inhibits movement of the tag along the stem.

The tag is reusable and does not obstruct the lens or the line of sight through the lens. The tag is discrete, which encourages individuals to try the eyeglass frames for fit and appearance. With the tag at the frame stem, the frame is more easily positioned for a comfortable fit to the face.

It will be understood that the embodiment described herein is merely exemplary and that a person skilled in the art may make many variations and modifications without departing from the spirit and scope of the invention. All such modifications and variations are intended to be within the scope of the invention as set forth in the claims herein.

We claim:

1. A method for positioning printed indicia on a temple of eyewear, the method comprising the steps of:

inserting an end of the temple through a first slot on a first end of a flexible identification tag;

inserting the end of the temple through a second slot on the first end of the identification tag;

sliding the identification tag along the temple until a second end of the identification tag is adjacent the end of the temple;

positioning the end of the temple through a second slot in the second end of the identification tag; and sliding the identification tag to a position on the temple selected for the identification tag.

2. The method according to claim 1, further comprising the step of:

folding the first end of the identification tag to facilitate placement of the temple in the first slot and the second slot or the first end in a single operation.

3. The method according to claim 1, wherein the second end of the identification tag includes two slots through which the end of the temple is placed.

4. The method according to claim 1, further comprising the step of:

unfolding the identification tag to its original shape by its own flexibility to create a resistant force against movement of the identification tag along the temple.

* * * * *